June 14, 1949. W. OSTLING 2,473,171
AUTOMATIC SPARK ADVANCE MECHANISM
Filed Feb. 18, 1947 6 Sheets-Sheet 1

INVENTOR.
William Ostling
BY
ATTORNEY.

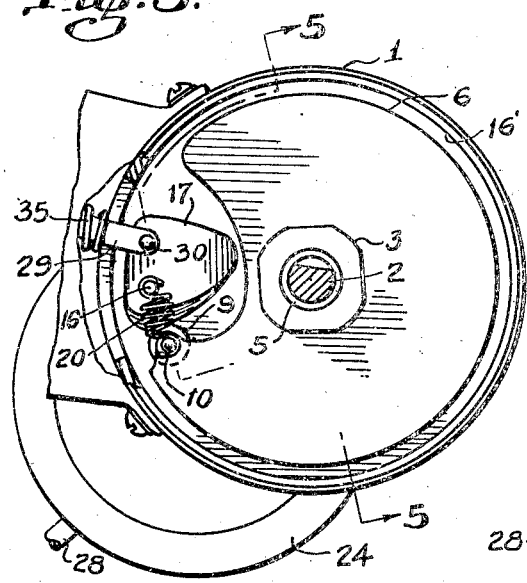
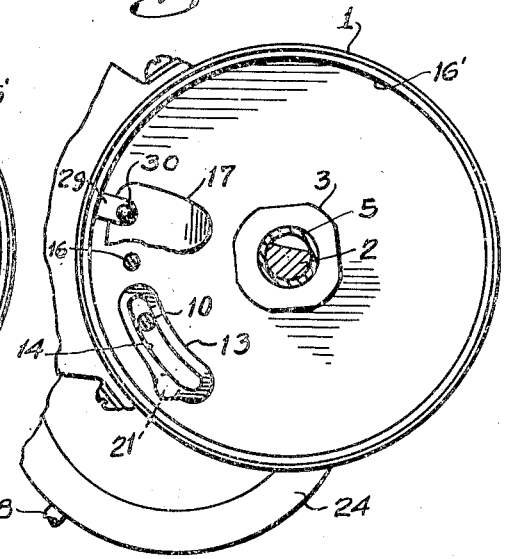
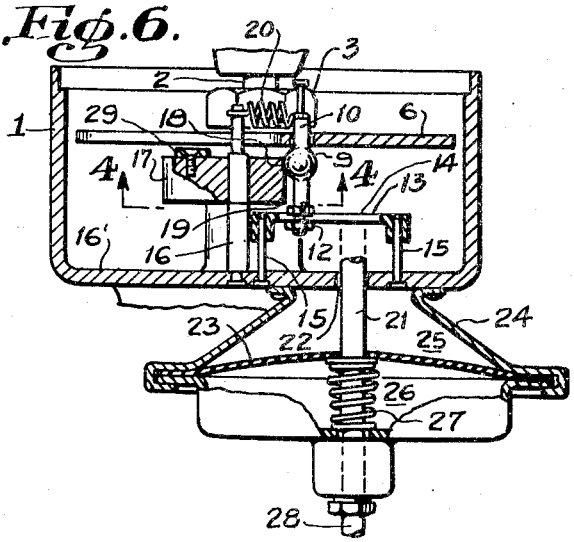
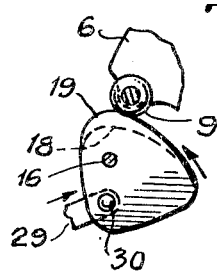

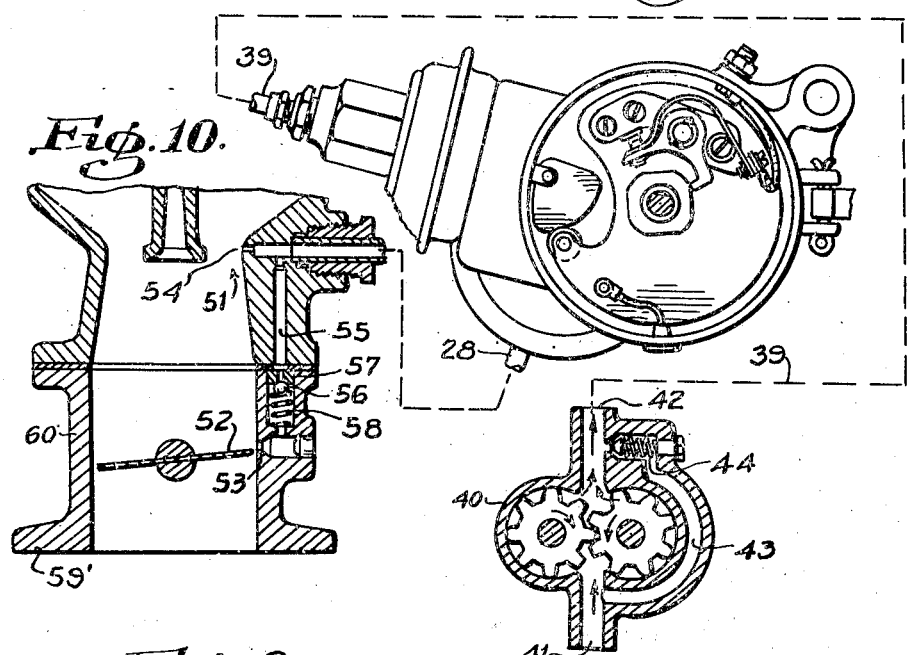
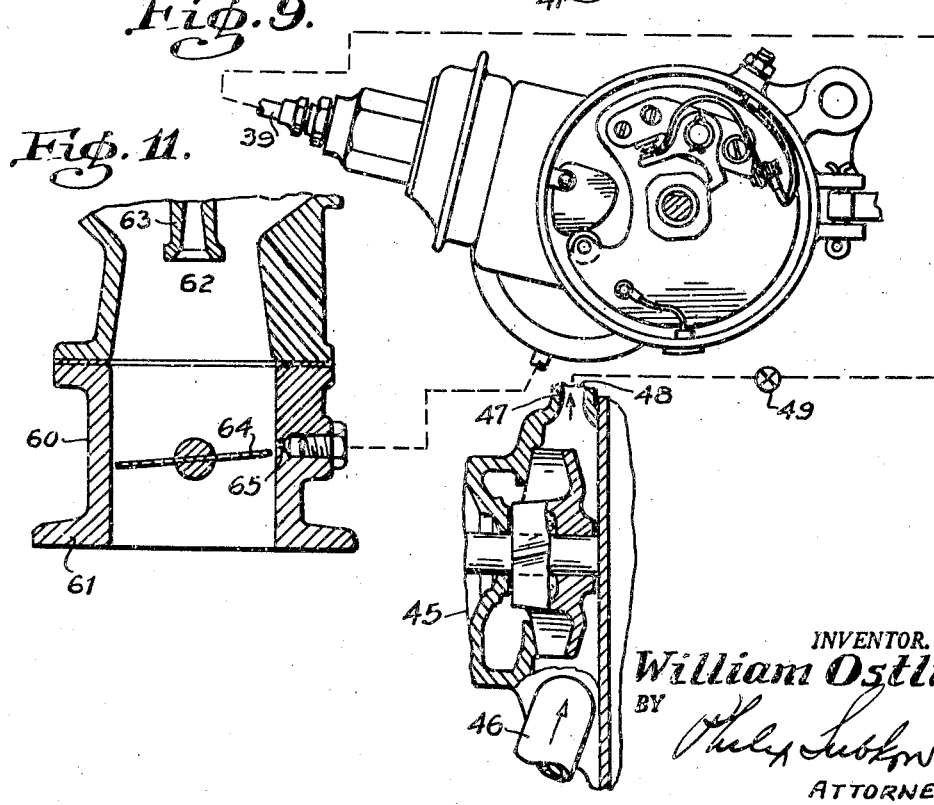

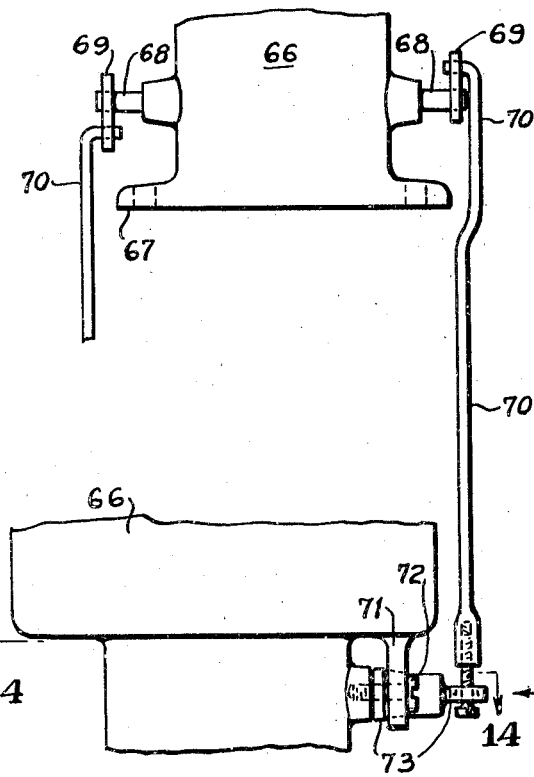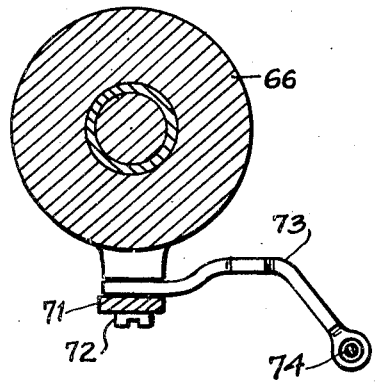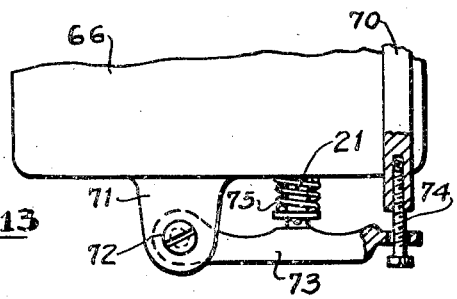

Patented June 14, 1949

2,473,171

UNITED STATES PATENT OFFICE 2,473,171

AUTOMATIC SPARK ADVANCE MECHANISM

William Ostling, Los Angeles, Calif., assignor to California Machinery and Supply Company, Ltd., Los Angeles, Calif., a corporation of Delaware Application February 18, 1947, Serial No. 729,374

21 Claims. (Cl. 123—117)

As is well recognized in this art, the spark timing has a major effect upon the efficiency of operation of a spark ignition engine. In order to obtain maximum power, ignition must occur before the compression stroke is completed, that is, before top dead center is arrived at by the piston, because the combustion process requires a finite time and it is desirable that the maximum pressure be developed in the cylinder before the expansion of the power stroke begins.

As will be seen later and as well known in this art, the higher the engine speeds, that is, the higher the linear velocity of the piston, the earlier must be the spark, in order that the combustion process have sufficient time to generate the maximum pressure by the time the piston reaches top dead center. The optimum position for the spark in relation to the stroke is determined by laboratory exeprimentation, as will be more fully set forth below.

The interval between the time of the spark and the arrival of the piston at top dead center is termed "the spark advance." The earlier the spark is generated in the compression stroke of the engine, the more advanced is the spark, and the nearer to the time of arrival of the piston at top dead center, the more retarded is the spark. The degree of spark advance may be measured in terms of the crank angle.

While the degree of spark advance is a function of engine speed, it is also a function of throttle position. Thus, at any engine speed the degree of spark advance desirable for part throttle operation is greater than that required for full throttle operation. The adjustment of the spark advance in a spark ignition engine is accomplished by adjusting the angular relation between the breaker cam and the breaker points. As is well known in this art, the distributor contains a cam shaft which is rotated usually at half engine speed. The cam shaft rotates a cam usually in the form of a nut with lobes equal in number to the number of cylinders fired by the distributor. Surrounding the cam shaft and concentric therewith is a non-rotating breaker plate upon which is mounted a breaker, the function of which is to open the circuit of the ignition system so that the condenser discharges across the cylinder plug points. The angular relationship between the breaker and the cam determines the point in the stroke of the piston when the breaker points will separate and the spark will jump.

The term "full load" refers to that load which is imposed upon the engine at full open throttle position at any given speed. In other words, it is the maximum load which may be imposed upon an engine when the throttle is wide open in order that a particular chosen speed be maintained at a steady rate.

"Part load" or "load at part throttle position" is that load which at any given speed is tolerable at any throttle position less than full.

"Road load" is that load which is at part throttle position. "Road load" has become a rather generally recognized term in this art to specify as standard a part load which corresponds to the load on an engine equivalent to that imposed by an automobile of medium weight with three people of average size when driving on a straight road without acceleration. This rather arbitrary loading corresponds to about a 35° throttle opening at speeds of about 3400 R. P. M. Road load may thus be stated as the load imposed on an engine operating at 3400 R. P. M. at sea level with the throttle, for example, at 35° from fully closed. With such road load imposed on the engine, as the throttle is opened beyond 35° the engine speeds up under such constant road load, and as the throttle is closed the engine slows down.

In order to determine the best spark position for all conditions of operation of the engine, the engine is tested under load either in a dynamometer or on the road and the spark is set manually by adjusting the breaker plate for all conditions of throttle position and speed to establish what is known as the ideal spark advance curves for full load and road load positions. If the spark is controlled to advance along these curves at full load and road load they will also be adequate at intermediate load conditions. Such curves and spark advance settings are hereafter referred to as ideal or optimum curves or settings.

During cranking and idling the spark for best operation is retarded. When operating at road load, the spark should be advanced, the degree of advance being greater as the speed at road load operations is higher. As the throttle is opened wider to full throttle position for full load operations the spark is best retarded, but at full throttle operation the spark should be more advanced the higher the speed at full load, i. e., wide open throttle.

Spark ignition internal combustion engines, particularly those used in the automotive field, have devices for automatically adjusting the spark advance in relation to engine speed and also in relation to the throttle position at such engine speed. One method employed is to attach the cam to centrifugal weights which are rotated by the cam shaft. As the engine speed increases the weights move out under centrifugal force and rotate the breaker cam relative to the drive shaft, thus advancing the spark. However, since at part throttle operation a greater spark advance at any engine speed is desirable than that for full throttle operation, it is desirable that the spark advance mechanism at part throttle operation advance the spark an amount in addition to that which is obtainable from the centrifugal spark advance mechanism. In one standard type of such device now employed the breaker plate is advanced above that obtainable from the centrifugal weight by means of a link connected to a pneumatically operated power means for actuating the link. This means is conventionally a diaphragm positioned in a chamber which is in turn connected to an orifice positioned at the throttle in the air fuel induction system.

In another form of such automatic spark advance, such as represented by the Vanderpoel and Ostling Patent No. 2,249,446, the centrifugal weights are omitted and the entire advance is pneumatically controlled.

In addition to the orifice positioned at the throttle, an orifice is placed either at the main carburetor veturi or at an auxiliary venturi, as described in the co-pending application Serial No. 694,266, filed August 31, 1946, by Garth L. Young and William Ostling. A by-pass is provided between the two orifices which are in turn connected to the pneumatic power means, specifically the diaphragm chamber similar to that described above. If desired a check valve may be placed in this by-pass. With such an arrangement the centrifugal weights may be entirely omitted and the spark advance may be obtained entirely by the rotation of the breaker plate by means of a stem connected to the diaphragm in the diaphragm chamber.

With such an arrangement at idling position the throttle orifice is on the carburetor side of the throttle and the velocity is so low that the vacuum generated is low. It is insufficient to advance the spark. When the throttle is opened to part throttle position the throttle orifice is on the manifold side of the throttle and is subjected to the vacuum of the intake manifold but this vacuum is in part bled through the Venturi orifice which is, of course, at a higher pressure, i. e., lower vacuum, and this modifies the excessive vacuum thus created by the manfold and the spark is advanced. When the throttle is opened to full open position, such as in the full load operation, the manifold vacuum drops substantially and is at practically atmospheric, but due to the velocity of the gases through the venturi there is a vacuum at the Venturi orifice which prevents the spark from being retarded to the degree it would have been if it had only been subjected to the manifold vacuum.

By positioning the check valve when the pressure at the venturi is lower than at the throttle orifice, as it is in full throttle position, the check valve closes so that the vacuum generated at the venturi is not bled by the higher pressure in the manifold, and thus the advance of the spark is increased over that which would have been obtained if the check valve had not been present.

It is an object of my invention to improve the operation of such spark advance mechanisms.

As is generally well recognized in this art, with such devices the suction exerted at road load (part throttle operation) may be excessive, especially at intermediate engine speed, and over advance the spark if the advance at full load is anywhere near that which is desired at full load. Additionally, the suction at road load operation in the carburetor containing only the throttle orifice falls rapidly as soon as engine speeds reach an upper limit, for example, about 1000 to 2000 R. P. M. This causes a retardation of the spark, i. e., an insufficient advance at such engine speeds. In order to obviate these excessive high vacuums, especially at lower and intermediate speeds under road load conditions, auxiliary bleeds have been introduced to bleed down the vacuum attained at the throttle orifice.

The difficulty with such bleeds is that they are non-selective in that they bleed at all positions of the throttle at high, low, and intermediate engine speeds. Thus, while they will bleed the excessive vacuums at low engine speeds under road load conditions, they will also bleed the insufficient vacuums attained at high engine speeds under road load conditions.

In another form of such device, the bleed orifice is positioned in the throat of the main carburetor venturi, as in the Vanderpoel-Ostling Patent No. 2,249,446, or in an auxiliary venturi as in the improved modifications of the Vanderpoel-Ostling type disclosed in the above co-pending application Serial No. 694,266.

The Vanderpoel-Ostling type of spark advance control avoids this excessive bleeding at high engine speeds by positioning the throttle orifice bleed at the throat of the carburetor venturi so that the pressures created in the throat at the high engine speeds do not excessively bleed the suctions created at the throttle orifice at high engine speeds under road load operations. Additionally a check valve may be introduced into the bleed by-pass to shut off the throttle orifice when the throttle opens so widely that the pressures at the throttle orifice are actually greater than at the Venturi orifice.

In this manner while the excessive vacuums at low engine speeds are bled down to prevent an over advance at low engine speeds, the pressures created at the throttle orifice at higher engine speeds are not bled down but the effective suctions are actually higher than that occurring at the throttle orifice. But even with this type of bleed the suctions created at road load speeds may for some engine designs be excessive to give an over advance of the spark if the advance at full load is of satisfactory character.

It is desirable that the automatic spark advance mechanism approximate as closely as possible the spark advance curve obtained both at full load and road load over all engine speeds under laboratory conditions, i. e., the ideal or optimum spark advance curve.

In the case of the governor controlled spark advance of the prior art, this may be accomplished by adjusting the advance caused by the governor with increase in engine speed and also by adjusting the retarding spring tension in order to determine the advance obtained by the vacuum. In this way the rate of advance with engine speed caused by the governor is controlled and the rate of advance with increase in vacuum is also controlled. It is usually possible by these controls to establish the full load spark advance curve in close approximation to the ideal curve. However, the difficulty is much greater when the road load advance curve is considered. Since the adjustment of the size of the orifice at the throttle and also the magnitude of the spring tension affect the entire curve at all engine speeds and load, the curve obtained for advance at different engine speeds at road load conditions may be made to fit the ideal curve at some engine speeds, but it is usually impossible to fit it throughout the entire range of engine speeds. Thus, if it is made to fit the curve at high engine speed the spark is usually under advanced at all lower engine speeds, or if it is made to fit at lower engine speeds it is usually far over advanced at high engine speeds.

In the case of the Vanderpoel-Ostling type of spark advance control, the full load curve can be made to approximate the ideal curve by a proper choice of orifice sizes at the throttle and venturi and by a proper choice of the retarding spring tension. However, the advance resulting at road load is not thus readily adjusted to the ideal curve. If the full load curve is adjusted properly the road load curve is over advanced and although some adjustment of orifice size and spring tension can be made to obtain the ideal full load curve while fitting the road load curve at some restricted range of engine speeds, it will be found that the advance is either excessive or insufficient at other engine speeds at road load. The ideal road load curve may, for some engines, not be approximate at all engine speeds by such adjustments.

In the automatic spark advance mechanism of my invention I do not depend upon the vacuum generated in the air fuel passage to actuate the spark advance mechanism. In the spark advance mechanism of my invention the spark is advanced responsive to engine speed. As the engine increases in speed at a full load or at road load the breaker plate is advanced the required degree to give the desired advance when the operation is at road load or the desired advance if the operation is at full load.

I have devised a fluid actuated device for actuating the cam plate in which the fluid pressure in said actuating device is responsive to engine speed. In order to obtain the desired advance at the above load conditions I employ a cam linkage which connects the fluid pressure actuated device with the breaker plate. I employ a plurality of cam surfaces one of which determines the advance at full load and another of which determines the advance at road load conditions.

I select the cam which is to actuate the advance of the breaker plate responsive to throttle position and therefore of the load on the engine. As has been previously pointed out the vacuum generated in the air fuel induction system, particularly at an orifice positioned at the throttle, is relatively low under full load operation and is relatively high under road load operation. The device of my invention therefore selects the cam surface which is to actuate the cam plate depending on the vacuums generated in the air fuel passage so that the road load cam actuates the cam plate when such pressures are below a predetermined upper limit, i. e., when the vacuums are high, and the full load cam actuates the breaker plate when the pressures in the air fuel induction system are above a predetermined circuit, i. e., when the vacuums are low. Instead of relying on the vacuums generated at full load, i. e., wide open throttle, or at road load, i. e., part open throttle, to select the cam to advance the breaker plate, I may mechanically connect the throttle to the selecting mechanism.

Other objects of my invention will be apparent in connection with the drawings, of which Fig. 1 is a section taken on line 1—1 of Fig. 2;

Fig. 3 is a fragmentary horizontal section taken on line 3—3 of Fig. 2;

Fig. 4 is a fragmentary detail of the cam mechanism;

Fig. 5 is a section taken on line 5—5 of Fig. 3;

Fig. 6 is a section similar to Fig. 5 showing the cam in another position;

Fig. 7 is a section taken on line 7—7 of Fig. 2;

Fig. 8 shows the use of the spark advance mechanism of my invention employing oil pressure as a source of fluid pressure for actuation of the spark advance mechanism;

Fig. 9 shows a similar view but employing the water pump for this purpose;

Fig. 10 shows a carburetor of the Vanderpoel-Ostling type, and also shows by dotted line its connection to the distributor of Fig. 8;

Fig. 11 is a view of a single throttle orifice carburetor, showing by dotted lines its connection to the device of Fig. 9;

Fig. 12 is a fragmentary view of another form of my device;

Fig. 13 is a side view taken on line 13—13 of Fig. 12;

Fig. 14 is a section taken on line 14—14 of Fig. 12;

Figure 1:
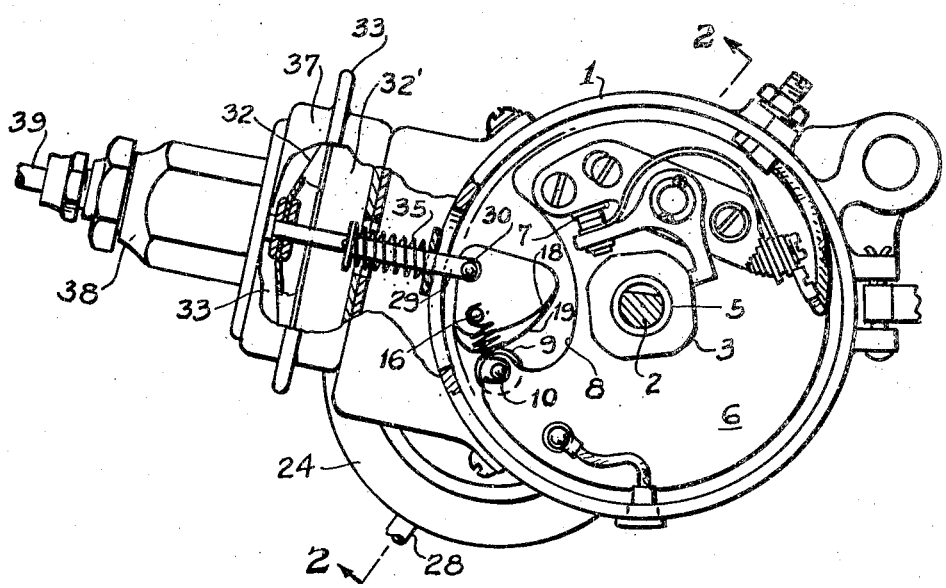
Figure 2:
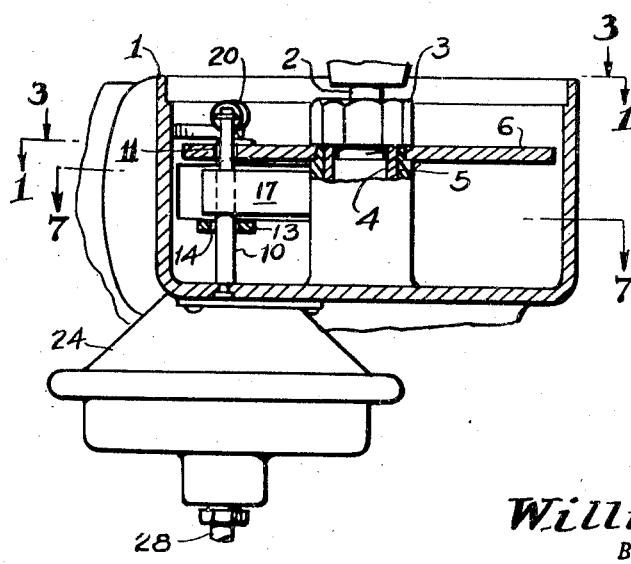
Fig. 2 is a vertical section taken on line 2—2 of Fig. 1.

The spark advance mechanism of my invention is similar to the conventional type of spark advance in that it is composed of a case 1, a cam shaft 2 rotated at half engine speed, a breaker cam 3 mounted for rotation in bearing sleeve 4. Around bearing sleeve 4 is rotatably mounted a sleeve 5 upon which is positioned a breaker plate 6 carrying the circuit breaker 7 and the usual connections as employed in spark advance mechanisms in this art. In the spark advance mechanism of my invention the breaker plate is cut away at 8 to allow for the movement of cams to be hereinafter described.

A bore 11 positioned in the breaker plate 6 permits the sliding motion in bore 11 of pin 10 which makes a sliding but close fit with the bore 11. Pin 10 is positioned within an arcuate slot 14 in the bracket 13 and is held in place by suitable nuts 12. The bracket 13 is slidably mounted upon pins 15 positioned in the base 16 of case 1. The cam 17 is rotatably mounted upon pivot pin 16 which is mounted in the base 16'. The cam, as will be more fully described, is of the barrel type having cam surfaces 18 and 19 whose functions will be more fully set forth hereinbelow. The pin 10 is connected to the pin 16 by a spring 20 which holds the cam follower 9 against the surface of the cam, depending upon the position of the follower to be more fully described hereafter.

The cam follower 9 is moved up and down against the surface of cam 17 by the movement of the bracket 13 which is connected for such vertical motion to the pin 21 passing through the bore 22 in the base. The pin 21 is in turn connected to the diaphragm 23 in the case 24. Chamber 25 is open to the case 1 through the bore 22 and the chamber 26 is connected to vacuum, as will be more fully described below, by means of the conduit 28. A spring 27 is so positioned as to tend to hold the rod 21 in an elevated position.

The cam 17 is rotated on its pivot 16 by means of the rod 29 which is pivotally connected to the cam at pivot 30. The rod 29 is actuated by the diaphragm 32 positioned in the chamber 33. The spring 35 is a retarding spring opposing the motion of the rod 29 and therefore tending to hold the device in retard position. Chamber 32' is open to the case while the chamber 37 is subjected to fluid pressure, as will be further described, through the conduit 39 through fitting 38. Conduit 39 is connected to any source of fluid pressure which is responsive to speed of the engine which is being controlled by the spark advance mechanism.

Such fluid pressure may be the oil pump illustrated in Figs. 8 and 10 usually employed with spark ignition engines, such as automotive engines, for the circulation of lubricating oil to the various parts of the engine. It may be connected as is shown in Figs. 9 and 11 to the water pump for the circulation of water or other cooling fluid as employed in such engines. Other sources of fluid pressure as, for example, the fuel pump discharge line where the engine is of the type wherein the fluid pressure of the fuel pump is a function of engine speed, as in direct injection engines; or it may be connected to the output of the supercharger in supercharged engines where the supercharger intake pressure does not vary materially.

For purposes of illustrating the principles of my invention and as a preferred embodiment the use of the oil pump and the water pump is shown in Figs. 8 to 11, inclusive, and their functions more fully described in Figs. 12 and 13.

In Figs. 8 and 10, the oil pump 40 which is shown as a conventional gear pump has the usual oil inlet 41 and outlet 42 and by-pass 43 provided with by-pass valve 44. Oil pump discharge 42 is connected to line 39. In the forms shown in Figs. 9 and 11 the water pump 45 has the usual inlet 46 and water discharge 47 to the cylinders. A by-pass 48 is connected to the discharge and is connected by means of valve 49 to the line 39.

Conduit 28 is connected to a source of vacuum which is responsive to load condition or throttle position, and as shown specifically in either form 10 or 11 this may be the fuel induction system of an internal combustion engine. In the form shown in Fig. 11 the line 28 is connected to the orifice positioned in the air fuel induction line at the throttle. Thus, the carburetor 60 of Figs. 9 and 11 is connected to the intake manifold at flange 61 and has the usual air inlet and fuel nozzles 62 and 63 and throttle 64. In the form shown in Fig. 11, an orifice 65 is provided in the throttle and so positioned that when the throttle is in closed position the orifice is on the carburetor side of the air induction side of the throttle and when the throttle is in part open position the orifice is on the intake manifold side of the throttle. In the case of the construction of Figs. 8 and 10 the carburetor is constructed according to the Vanderpoel-Ostling device and has the usual fuel nozzle and air inlet, a venturi 51 and throttle 52 and is connected to the intake manifold at 59'. An orifice 54 is positioned at the throat of the venturi 51 and the orifice 53 is positioned with respect to the throttle 52 so that the orifice 53 is on the nozzle or air intake side of the throttle 52 when the throttle is in closed position, as shown in Figs. 8 and 10, and on the intake manifold side of the throttle when the throttle 52 is in open position. A by-pass 55 connects the orifice 53 and the orifice 54. In the by-pass 55 a valve 56 may be provided with a seat 57 and a spring 58 of such strength that it is just sufficient to hold the valve 56 against gravity so that the valve 56 is closed when pressure is equalized on both sides of the valve. The line 28 is connected to the by-pass 55 between the valve 56 and the orifice 51. The valve 56 may be omitted in this construction. I may employ either form of carburetor, as shown in Figs. 10 and 11, with any of the forms of distributors herein described and operating in conjunction with any source of fluid pressure herein described.

Instead of employing the vacuums in the air fuel induction system to actuate the rod 21 as in the case of the devices of Figs. 8 to 11, inclusive, I may employ a mechanical linkage to actuate the rod 21 in the devices of Figs. 5 and 6, which linkage is connected to the throttle so that when the throttle is in full open position the rod 21 is lifted to move the cam follower to the position of Fig. 6, and as the throttle is moved to part throttle position the rod 21 is moved down to the position shown in Fig. 5.

Such an arrangement is shown in Figs. 12 to 14, inclusive.

The carburetor 66 which may be connected at flange 67 to the intake manifold has the conventional throttle mounted on the throttle shaft 68 rotated by links 69 and 70 in the conventional manner.

The throttle extension 68 has mounted thereon a crank arm 69 which rotates with the shaft 68. The crank is connected by a link 70 to the spark advance mechanism.

The rod 21 instead of being connected to the diaphragm, as in Figs. 5 and 6, is actuated by a lever 73 which is hinged on the case 1 by hinge 72 positioned in a bracket 71. The lever is moved by link 70 through a lost motion linkage 74. The spring 75 acts to hold the rod 22 down so that the follower is in the position shown in Fig. 5 until the link 70 moves the shaft 68 to move the throttle to wide open position whereupon 74 has moved up sufficiently to engage the arm 73 to actuate the rod 21 against the spring 75 to move the cam follower to the position of Fig. 6.

Instead of mounting the cam follower on the breaker plate, the breaker plate may carry cam surfaces so contoured that when a cam follower is actuated by the rod the breaker plate is advanced in the manner described above. The selection of the cam surface by movement of the cam follower responsive to throttle position is made possible by providing a suitable slot in a bracket in a manner analogous to that described above allowing for the linear motion of the rod.

Instead of moving the cam follower for selection of the cam surface, the cams may be moved for such selection by suitable variation in the construction of the above devices. Thus the cam 17 may be mounted for rotation on pin 16 and moved up and down by a connection between rod 27 and the cam, which will move the cam up and down while permitting rotation. In such case the follower may be fixed on the breaker plate.

Figure 15:
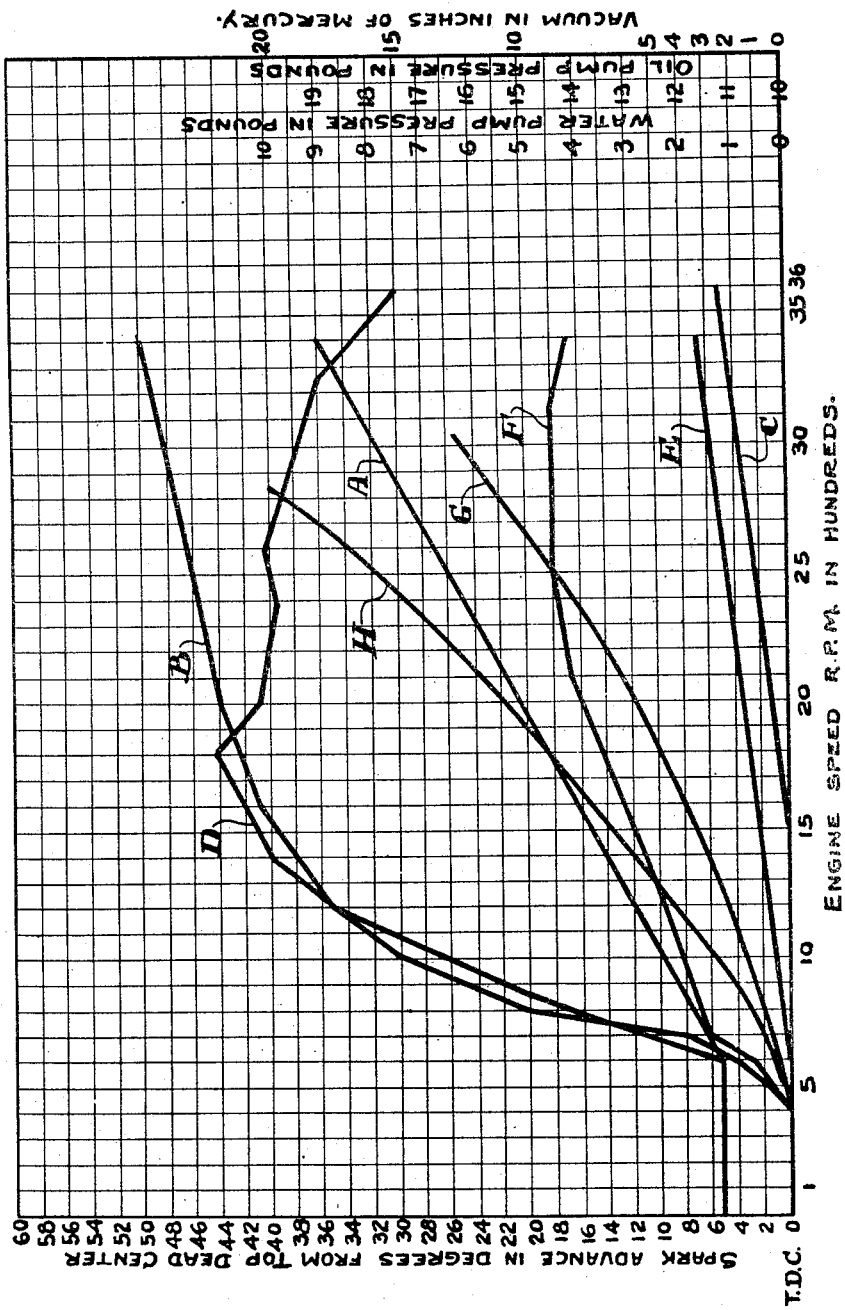
Fig. 15 is a chart showing the variation of the spark advance, carburetor vacuum, water pump discharge pressure and oil pump discharge pressure with engine speed.

Line A in Fig. 15 shows the full load advance and curve B shows the road load advance for an engine of specific design, i. e., the ideal road load and full advance which is desired to reproduce by the automatic spark advance mechanism.

In the device of my invention the orifices and the carburetors illustrated in Figs. 8 to 11 are so designed that the maximum vacuum generated at the high speeds at road load is at all speeds above a low speed in the neighborhood of idling speeds greater than the vacuum generated at high speed at full load. This is accomplished by positioning the throttle orifice as previously described and making it sufficiently large so that the pressure drop between the air fuel induction system at the orifice and the diaphragm chamber 32 is made relatively small. In the case of the Vanderpoel-Ostling type the same expedient may be employed. By maintaining the ratios of the orifice openings 53 and 54 sufficient so that the bleed by the Venturi orifice is sufficient to but moderately depress the vacuum at low speeds, I may obtain the vacuum curves such as illustrated in Fig. 15. Line C illustrates the vacuum at full load operation at all speeds up to about 3600 R. P. M. when employing a single orifice carburetor design such as shown in Figs. 10 and 11 with the orifice proportioned to give the vacuums illustrated in Line C. Curve D illustrates the vacuums generated at part throttle road load operations for the same engine and carburetor construction. It will be observed that in the specific example illustrated by the curve the vacuum of 2.5 at 3600 R. P. M. at full load is attained at road load at a speed of about 600 R. P. M.

Line E gives the vacuum in diaphragm chamber 26 at full load operation employing the devices of Figs. 8 and 9 with the orifices properly proportioned to give this vacuum variation, while curve F gives the vacuum in the same chamber at road load operation with the same engine and carburetor construction. It will be observed that the full load vacuum of 3.2 inches at 3400 R. P. M. is attained in the specific example illustrated by these curves at 700 R. P. M. at road load.

These curves illustrate that by making the throttle orifice sufficiently wide it is possible, at low speed at road load, to have the vacuum rise rapidly as the throttle passes the orifice to place it upon the manifold side of the throttle. If the orifice is made smaller or if the Venturi orifice is made larger this rapid rise at low speed is not attained. By proper proportioning the throttle orifice by increasing its size the rise may be made rapid so that the full load vacuum attained at high speed of 3400 to 3600 R. P. M. is attained at low speeds within the range of 600 to 800 R. P. M. and under 1000 R. P. M.

Curve G illustrates the water pump discharge pressure which is exerted in the diaphragm 37 at various engine speeds ranging from idling speed of about 400 R. P. M. up to a speed, as illustrated by the drawing, of about 3100 R. P. M., the curve progressing higher as the speed increases. Curve H illustrates the oil pump discharge pressure exerted in the same diaphragm chamber in the same range of engine speeds.

In order to attain the desired full load advance employing either the water pump or the oil pump discharge pressure the cam surfaces at edges 18 and 19 are designed to give the desired advance with pressure. Curve I gives the advance desired upon the imposition of the water pump pressures at various engine speeds which must be attained if the advance of line A is to be attained. The advance of the spark along curve I upon the attainment of the various pressures indicated by said curve will give the advance of line A, Fig. 15. Curve I therefore indicates the nature of the cam surface, giving effect to the position and angular motion of the cam follower and the spring constant of the spring 35, which is necessary in order to advance the spark along line A if the pump pressure varies with speed as indicated by curve G.

Curve J gives the advance which must be attained by this device upon the imposition of various oil pump pressures at various engine speeds to attain the spark advance of line A. Therefore it indicates the nature of the cam surface, similarly to curve I, necessary to obtain the advance indicated by curve A upon the attainment of oil pump discharge pressure as indicated on curve H of Fig. 15.

Cams so designed will give the advance along curve A at various engine speeds if the pump pressure thus attained is according to curve G or H respectively.

Curve K gives the advance desired at road load operation obtained upon the imposition of water pump pressure to obtain the advance of curve B, and curve L is the advance at road load which must be attained upon the imposition of oil pump pressure to obtain the advance of curve B. Cams so contoured to give the advances according to K or L, as the case may be, upon the imposition of the pressures as shown in Fig. 13, will give the advance of curve B when the pressures vary with engine speeds as indicated in Fig. 15. Cam 17 is contoured in accordance with these principles. Thus, edge 19 is contoured to give full load advance of curve A, and 18 is contoured to give the road load advance.

In the above example, at full load operation the vacuums attained, as shown in curve C employing the forms of Figs. 10 or 11, do not attain a magnitude in excess of about 2 to 3 inches of mercury at speeds up to about 75 miles an hour. Up to 3500 to 4000 R. P. M., the spring 27 is so set that at vacuums under 3 inches of mercury, the diaphragm is elevated to place the cam follower in the position shown in Fig. 6 against the full load edge of the cam.

The pressures imposed in diaphragm chamber 37 depending upon whether the pressure is the oil or the water pressure, will follow the curves H or G as engine speed varies. The imposition of such pressures will advance the cam 30 in response to engine speed to advance the cam follower and the breaker plate to give the advances along curve A with respect to engine speed.

Figure 16:
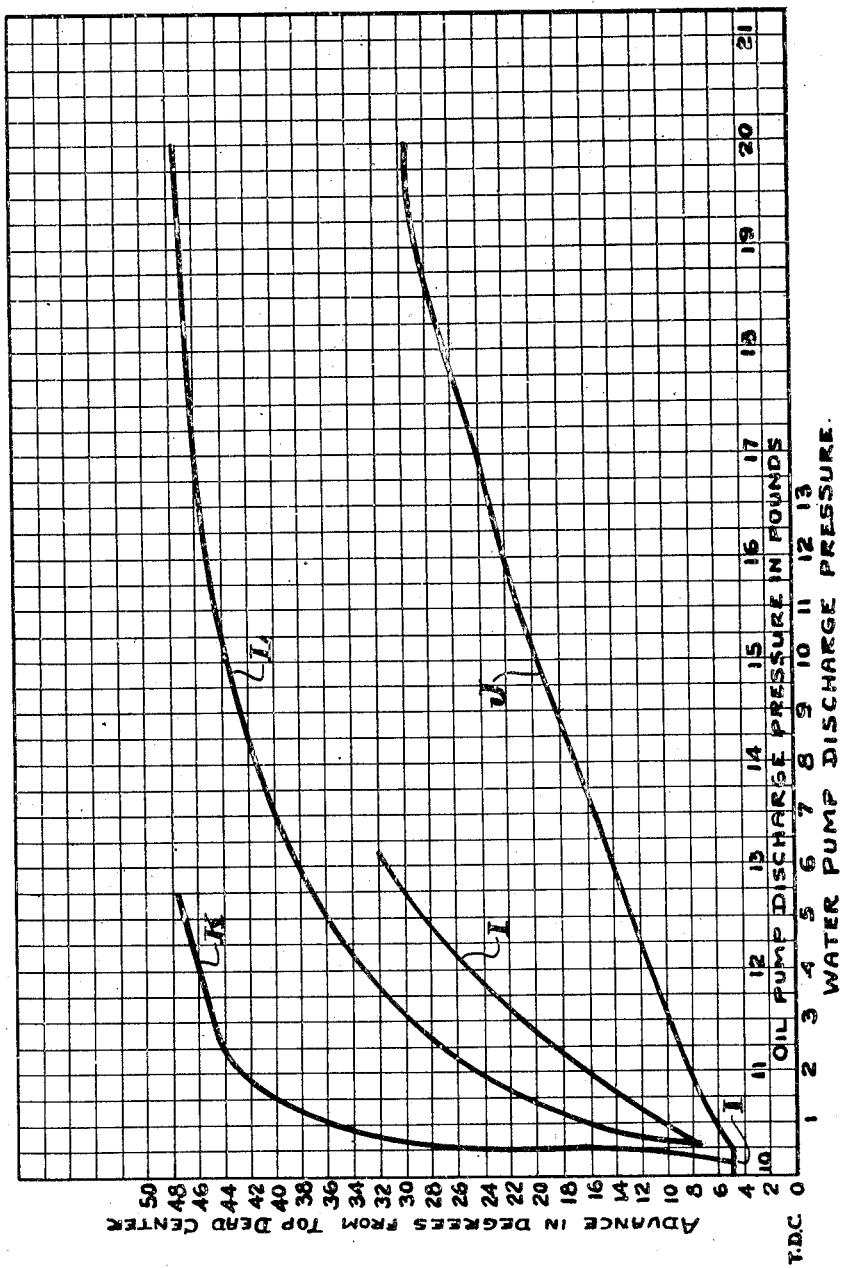
Fig. 16 is a chart showing the variation of the advance with water pump discharge pressure and oil pump discharge pressure as employed in my invention.

Upon movement of the open throttle to part open throttle at road load assuming the operation is according to Figs. 10 or 11, the vacuums generated in diaphragm chamber 26 will, at engine speeds up to about 625 R. P. M., be less than three inches and the cam follower 9 will be in the position shown in Fig. 6. The advance therefore at these speeds will be along the full load curve A up to about 625 R. P. M. However, as the engine speeds up above this point the vacuum generated immediately becomes greater than the said three inches and overcomes the spring tension so that the diaphragm is depressed and the cam follower takes the position of Fig. 5. The cam follower is now against the cam surface 18 and the road load advance along curve B is then possible, as previously described. When employing the form of carburetor shown in Figs. 8 and 9 at full load, wide open throttle the vacuums generated in the specific example illustrated above range from up to about 3.2 to 3½" at speeds of about 3600 R. P. M., as shown in Fig. 12. The spring 27 is thus adjusted so that at all vacuums less than about 3½" of mercury the cam follower is in the position shown in Fig. 6, and the cam being designed to give the advance upon the imposition of the pressures indicated, Figs. 15 and 16 as previously described, the advance is along curve A with variation in engine speed.

In the case of the road load oepration in the above specific example vacuums of more than 3½" occur at speeds of about 700 R. P. M. or higher, and therefore at speeds of less than about 700 R. P. M. the cam follower is in the position shown in Fig. 6 and the advance is along the full load curve A until such speed is attained, whereupon, the vacuum being 3½", the spring tension is overcome and the diaphragm is depressed, moving the cam follower from the position shown in Fig. 6 to that shown in Fig. 5, and the advance from there on at higher engine speeds follows curve B as previously described.

In the form of device shown in Figs. 12 to 14, inclusive, the motion of the cam follower to select the cam is made dependent directly on throttle position instead of indirectly through the effect of the resultant vacuums. Thus, when the throttle is in wide open position the cam follower is moved to the full load cam surface and when the throttle is moved to part throttle position the cam follower is moved to the road load edge of the cam.

Since the cams are contoured as described above the road load advance or the full load advance is then attained in the manner described above.

It will be understood that the charts and values chosen as representing road load are merely illustrative of a specific example of an operation for the purpose of illuminating the principles of my invention. The specific values of the vacuums, pressures, and advance as a function of engine speeds depend on the design characteristics of the engine and on the values of throttle position, speed, and load chosen as representing road load and will change with variations in engine design and the values of loading chosen to represent road load. In accordance with the principles set forth above in connection with specific examples, the desired advance at full load and on that degree of loading chosen to represent road load may be obtained.

While I have described a particular embodiment of my invention for the purpose of illustration, it should be understood that various modifications and adaptations thereof may be made within the spirit of the invention as set forth in the appended claims.

I claim:

1. An automatic spark advance mechanism, which comprises a breaker cam, a cam shaft, a circuit breaker in operative association with said breaker cam, a rotatable mounting for said circuit breaker, means for rotating said breaker mounting about the axis of said cam, comprising a fluid pressure power means, a driving connection between said power means and said mounting, said driving means including a cam actuated linkage in said driving means, said cam actuated linkage including a plurality of cam surfaces, a cam follower, and selective positioning means for selecting the cam surface contacting said follower.

2. In the spark advance mechanism of claim 1, said selective positioning means comprising a linkage adapted for connection to the throttle of a spark ignition engine in operative association with said mechanism, and means for moving said link responsive to throttle position.

3. In combination with the spark advance mechanism of claim 1, a source of fluid pressure responsive to engine speed, and a fluid conduit connecting said source of fluid pressure and said fluid pressure power means.

4. In combination with the spark advance mechanism of claim 1, said source of fluid pressure comprising a pump adapted to be driven by the spark ignition engine to which said spark advance mechanism is connected, a pump discharge, and a by-pass connected to said discharge and said fluid pressure power means.

5. In the structure of claim 1, said selective means including a diaphragm chamber, a diaphragm in said chamber, a conduit connected to said diaphragm, and a rod connecting said diaphragm to said follower.

6. In an automatic spark advance mechanism, a breaker cam, a cam shaft, a circuit breaker in operative association with said breaker cam, a rotatable mounting for said circuit breaker, means for rotating said breaker mounting about the axis of said cam, comprising a fluid pressure power means, a driving connection between said power means and said mounting, said driving means including a cam actuated linkage in said driving means, said cam actuated linkage including a plurality of cam surfaces, a cam follower, selective positioning means for selecting the cam surface contacting said follower, said selective positioning means comprising a linkage adapted for connection to the throttle of a spark ignition engine in operative association with said mechanism, means for moving said link responsive to throttle position, said linkage including a link connection adapted for connection to the throttle pivot shaft of the throttle of a spark ignition engine in operative association with said mechanism and said selecting means.

7. In combination with the spark advance mechanism of claim 6, a pump adapted to be driven by the spark ignition engine to which said spark advance mechanism is connected, a pump discharge, and a by-pass connected to said discharge and said fluid pressure power means.

8. In combination with the spark advance mechanism of claim 6, a pump for pumping liquid adapted to be driven by the spark ignition engine to which said spark advance mechanism is connected, a pump discharge, and a by-pass connected to said discharge and said fluid pressure power means.

9. In an automatic spark advance mechanism, a breaker cam, a cam shaft, a circuit breaker in operative association with said breaker cam, a rotatable mounting for said circuit breaker, means for rotating said breaker mounting about the axis of said cam, comprising a fluid pressure power means, a driving connection between said power means and said mounting, said driving means including a cam actuated linkage in said driving means, said cam actuated linkage including a plurality of cam surfaces, a cam follower, selective positioning means for selecting the cam surface contacting said follower, said selective means including a diaphragm chamber, a diaphragm in said chamber, a conduit connected to said diaphragm, a rod connecting said diaphragm to said follower, a carburetor, an air fuel passageway to said carburetor, a throttle in said passageway, an orifice in said passageway positioned in relation to said throttle so that it is on the air inlet side of said carburetor when said throttle is in closed position and on the intake manifold side of said throttle when said throttle is in part open position, said conduit connected to said diaphragm chamber being connected also to said orifice.

10. In combination with the spark advance mechanism of claim 9, a pump adapted to be driven by the spark ignition engine to which said spark advance mechanism is connected, a pump discharge, and a by-pass connected to said discharge and said fluid pressure power means.

11. In combination with the spark advance mechanism of claim 9, a source of fluid pressure responsive to engine speed, and a fluid conduit connecting said source of fluid pressure and said fluid pressure power means.

12. An automatic spark advance mechanism, which comprises a breaker cam, a cam shaft, a circuit breaker in operative association with said breaker cam, a rotatable mounting for said circuit breaker, means for rotating said breaker mounting about the axis of said cam, comprising a fluid pressure power means, a driving connection between said power means and said mounting, said driving means including a cam containing a plurality of differently contoured surfaces, one of said surfaces being contoured for wide open throttle advance and another of said surfaces being contoured for part throttle advance, a connection between said cam and said fluid pressure power means, a cam follower movably mounted in association with said cam and in driving connection to said mounting, a rod connected to said cam follower for motion along said cam from one of said contoured surfaces to another of said contoured surfaces, and a pneumatically operated power means connected to said rod for movement of said cam follower.

13. In the spark advance mechanism of claim 12, said pneumatically operated power means including a diaphragm chamber, a diaphragm in said chamber, a connection between said rod and said diaphragm, and a conduit connected to said chamber.

14. In combination with the spark advance mechanism of claim 12, a pump adapted to be driven by the spark ignition engine to which said spark advance mechanism is connected, a pump discharge, and a by-pass connected to said discharge and said fluid pressure power means.

15. In combination with the spark advance mechanism of claim 12, said pneumatically operated power means including a diaphragm chamber, a diaphragm in said chamber, a connection between said rod and said diaphragm, a conduit connected to said chamber, a carburetor, an air and fuel inlet to said carburetor, an air fuel passageway, a throttle in said pasageway, an orifice in said passageway at said throttle so positioned that it is on the air and fuel inlet side of said throttle when the throttle is in closed position and on the outlet side of said carburetor when the throttle is in part open position, and a connection between said orifice and said conduit connected to said diaphragm chamber.

16. An automatic spark advance mechanism, which comprises a breaker cam, a cam shaft, a circuit breaker in operative association with said breaker cam, a rotatable mounting for said circuit breaker, means for rotating said breaker mounting about the axis of said cam, comprising a fluid pressure power means, a driving connection between said power means and said mounting, said driving means including a cam containing a plurality of differently contoured surfaces, one of said surfaces being contoured for wide open throttle advance and another of said surfaces being contoured for part throttle advance, a connection between said cam and said fluid pressure power means, a cam follower movably mounted in association with said cam and in driving connection to said mounting, a rod connected to said cam follower for motion along said cam from one of said contoured surfaces to another of said contoured surfaces, and a linkage for connection to the throttle of a spark ignition internal combustion engine for movement of said cam follower responsive to throttle position.

17. In combination with the spark advance mechanism of claim 16, a pump adapted to be driven by the spark ignition engine to which said spark advance mechanism is connected, a pump discharge, and a by-pass connected to said discharge and said fluid pressure power means.

18. An automatic spark advance mechanism, which comprises a breaker cam, a cam shaft, a circuit breaker in operative association with said breaker cam, a rotatable mounting for said circuit breaker, means for rotating said breaker mounting about the axis of said cam, comprising a fluid pressure power means, a driving connection between said power means and said mounting, said driving means including a cam containing a plurality of differently contoured surfaces, one of said surfaces being contoured for wide open throttle advance and another of said surfaces being contoured for part throttle advance, a connection between said cam and said fluid pressure power means, a cam follower movably mounted in association with said cam and in driving connection to said mounting, a rod connected to said cam follower for motion along said cam from one of said contoured surfaces to another of said contoured surfaces, a carburetor, an air fuel passageway, a throttle in said passageway, and means for adjusting said rod responsive to throttle position.

19. In combination with the spark advance mechanism of claim 18, a pump adapted to be driven by the spark ignition engine to which said spark advance mechanism is connected, a pump discharge, and a by-pass connected to said discharge and said fluid pressure power means.

20. An automatic spark advance mechanism, which comprises a breaker cam, a cam shaft, a circuit breaker in operative association with said breaker cam, a rotatable mounting for said circuit breaker, means for rotating said breaker mounting about the axis of said cam, comprising a fluid pressure power means, a driving connection between said power means and said mounting, said driving means including a cam containing a plurality of differently contoured surfaces, one of said surfaces being contoured for wide open throttle advance and another of said surfaces being contoured for part throttle advance, a connection between said cam and said fluid pressure power means, a cam follower movably mounted in association with said cam and in driving connection to said mounting, a rod connected to said cam follower for motion along said cam from one of said contoured surfaces to another of said contoured surfaces, a pneumatically operated power means connected to said rod for movement of said cam follower, said pneumatically operated power means including a diaphragm chamber, a diaphragm in said chamber, a connection between said rod and said diaphragm, a conduit connected to said chamber, a carburetor, an air and fuel inlet to said carburetor, an air fuel passageway, a throttle in said passageway, an orifice in said passageway at said throttle so positioned that it is on the air and fuel inlet side of said throttle when the throttle is in closed position and on the outlet side of said carburetor when the throttle is in part open position, a connection between said orifice and said conduit connected to said diaphragm chamber, a pump adapted to be driven by the spark ignition engine to which said spark advance mechanism is connected, a pump discharge, and a by-pass connected to said discharge and said fluid pressure power means.

21. An automatic spark advance mechanism, which comprises a breaker cam, a cam shaft, a circuit breaker in operative association with said breaker cam, a rotatable mounting for said circuit breaker, means for rotating said breaker mounting about the axis of said cam, comprising a fluid pressure power means, a driving connection between said power means and said mounting, said driving means including a cam containing a plurality of differently contoured surfaces, one of said surfaces being contoured for wide open throttle advance and another of said surfaces being contoured for part throttle advance, a connection between said cam and said fluid pressure power means, a cam follower movably mounted in association with said cam and in driving connection to said mounting, a rod connected to said cam follower for motion along said cam from one of said contoured surfaces to another of said contoured surfaces, a pneumatically operated power means connected to said rod for movement of said cam follower, said pneumatically operated power means including a diaphragm chamber, a diaphragm in said chamber, a connection between said rod and said diaphragm, a conduit connected to said chamber, a carburetor, an air and fuel inlet to said carburetor, an air fuel passageway, a throttle in said passageway, an orifice in said passageway at said throttle so positioned that it is on the air and fuel inlet side of said throttle when the throttle is in closed position and on the outlet side of said carburetor when the throttle is in part open position, a connection between said orifice and said conduit connected to said diaphragm chamber, a pump adapted to be driven by the spark ignition engine to which said spark advance mechanism is connected, a pump discharge, and a by-pass connected to said discharge and said fluid pressure power means.

WILLIAM OSTLING.

No references cited.